United States Patent [19]

Thacker

[11] Patent Number: 4,747,185

[45] Date of Patent: May 31, 1988

[54] ELECTRICAL APPARATUS FOR THE ELECTROCUTION OF CATTLE

[76] Inventor: Fred E. Thacker, 91113 Sunderman Rd., Springfield, Oreg. 97477

[21] Appl. No.: 2,372

[22] Filed: Jan. 12, 1987

[51] Int. Cl.⁴ .............................................. A22B 3/06
[52] U.S. Cl. ...................................................... 17/1 E
[58] Field of Search .......................................... 17/1 E

[56] References Cited

U.S. PATENT DOCUMENTS

| | | | |
|---|---|---|---|
| 1,553,135 | 9/1925 | Byrnes | 17/1 E |
| 1,949,985 | 3/1934 | Weber | 17/1 E |
| 2,002,755 | 5/1935 | Regensburger | 17/1 E |
| 3,163,884 | 1/1965 | Dunaway | 17/1 E |
| 3,314,103 | 4/1967 | Rains | 17/45 |
| 4,031,591 | 6/1977 | Collins | 17/1 E |

FOREIGN PATENT DOCUMENTS 364386  1/1932  United Kingdom ................. 17/1 E

*Primary Examiner*—Willie G. Abercrombie
*Attorney, Agent, or Firm*—James D. Givnan, Jr.

[57] ABSTRACT

An apparatus including a handheld tool having a pair of jaws at one end operated by an air cylinder and linkage for penetrating engagement with the animal's skull. The linkage is coupled to jaws intermediate the pivoted and distal ends of the jaws. A current flow is imparted to each jaw. Control means includes a tool mounted switch which closes relay means in a control box to initiate timer operation for a selected period during which a solenoid air valve pressurizes the tool cylinder. During this period a transformer provides increased voltage to the tool jaws and to a mat on which the animal stands. A tether on the tool is automatically retracted at the end of an electrocution cycle.

8 Claims, 2 Drawing Sheets

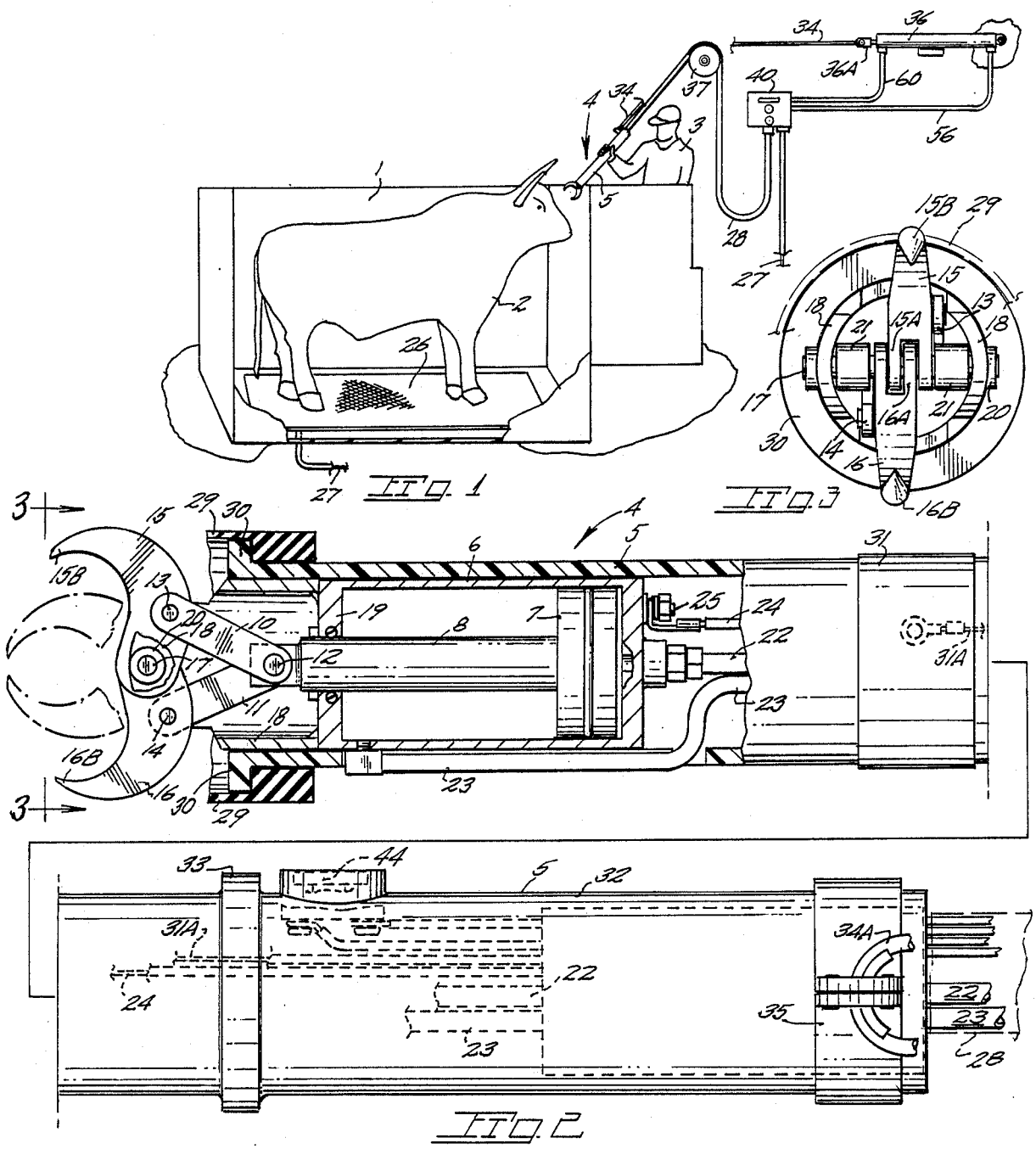

ELECTRICAL APPARATUS FOR THE ELECTROCUTION OF CATTLE

BACKGROUND OF THE INVENTION

The present invention pertains generally to equipment used in slaughter houses for the killing of cattle. In the processing of cattle for market it is highly desirable that the animals be killed in a quick and humane manner which objectives are currently not being realized with known killing methods and equipment. A second consideration is that the method used should be such as to cause minimal damage to and waste of the consumable portions of the animal. A still further consideration is that the equipment not constitute a hazard to the operator and that the animal be killed quickly to prevent the animal being a threat to the operator. Additionally desirable is that such equipment be adaptable to the size and specie of animal being processed to avoid premature rigor mortis which impedes later processing. Such equipment is subject to federal regulation.

In the prior art are tongs having electrodes at their distal ends for application to the animal to cause an electrical current flow to be completed through a portion of the animal's body with the circuit being completed through one of the electrodes or, in other systems, through the animal's feet in place on an isolated grounded surface. Some examples of the foregoing prior art equipment are found in the following U.S. Pat. Nos. 1,553,135; 1,949,985; 2,002,755; 3,163,884; 3,314,103.

A specific problem exists in establishing good electrical conduction between the electrical apparatus electrodes and the animal. Typically the animal when subjected to existing equipment will move in a dynamic fashion ofttimes disrupting the conduction of current to the animal. Accordingly, a manually held apparatus incurs the severe drawback of the operator necessarily keeping the electrodes embedded within the animal for the duration necessary to cause fibrillation. Any interruption in the current flow through the animal inhumanely prolongs the animal's condition.

U.S. Pat. No. 1,553,135 discloses an apparatus for imparting an electrical charge to an animal being slaughtered wherein a floor of a killing box or knocking box is grounded. U.S. Pat. No. 2,002,755 discloses stunning tongs equipped with a pair of electrodes in circuit with a handle mounted switch. U.S. Pat. No. 3,163,884 discloses tubular arms which carry wires and contacts the latter urged into engagement with the animal by means of an air cylinder supported on a handheld base equipped with finger operated switches. An electrical system in the foregoing patent includes timer, transformer and relay components.

SUMMARY OF THE PREFERRED INVENTION

The present invention is embodied within an apparatus for electrocuting cattle in a high volume meat processing establishment.

The present apparatus includes an operator guided tool which effects gripping engagement with the animal's bone structure whereupon the tool is released by the operator until a period of time has elapsed when the tool jaws will open to permit automatic retraction of the tool. A motor for the jaws is shown as an air cylinder which drives jaws which move about a pivot pin. The tool is preferably tethered for automatic retraction away from the animal at the termination of an elapsed period of time. The apparatus includes a control box having controls permitting the operator to select the duration of voltage flow.

Electrical current is provided to the tool jaws in a manner obviating the use of complex jaw structure susceptible to wear and malfunction. Motor means, jaw linkage and jaws provide a lightweight, easily manipulated tool having extremely powerful jaw closing pressures to effect secure engagement with a skeletal portion of the animal preferably the animal's skull. Secure tool attachment to the animal permits the operator to release the tool after setting same with delayed opening of the jaws and automatic retraction of the tool out of the killing box. Such retraction may be accomplished by a line retraced by an air cylinder or simply provided with a counterweight.

Important objectives of the present apparatus include the provision of an electrical apparatus including a handheld tool having motor driven jaws which effect a good electrical contact with bone structure of the animal to administer a current flow thereto; the provision of an electrical apparatus including an elongate body adapted to be held at one end and with tether means which automatically retracts normally handheld elongate body at the completion of any lapsed period of time; the provision of an apparatus having a handheld tool which engages the animal in a secure manner without operator effort beyond tool engagement with the animal; the provision of an apparatus for cattle electrocution wherein current flow is through cylinder structure to conductive jaws of the tool; the provision of an electrical apparatus wherein toggle driven jaws move about a common pivot supported by a cylinder extension and through which current flow occurs; the provision of an electrical apparatus for the electrocution of cattle which avoids physical damage to the brain of the animal; the provision of an electrical apparatus which produces rigor mortis in the animal in an accelerated manner to minimize hanging time by reason of grading to be done a shorter time after electrocution than with other killing practices.

BRIEF DESCRIPTION OF THE DRAWINGS

In the accompanying drawings:

FIG. 1 is a perspective view of the present apparatus in place adjacent an enclosure for the animal being processed;

FIG. 2 is a side elevational view of a handheld tool of the apparatus segmented and with parts broken away for purposes of illustration;

FIG. 3 is an end elevational view of the tool taken along line 3—3 of FIG. 2;

DETAILED DESCRIPTION OF THE PREFERRED EMBODIMENTS

Figure 4:
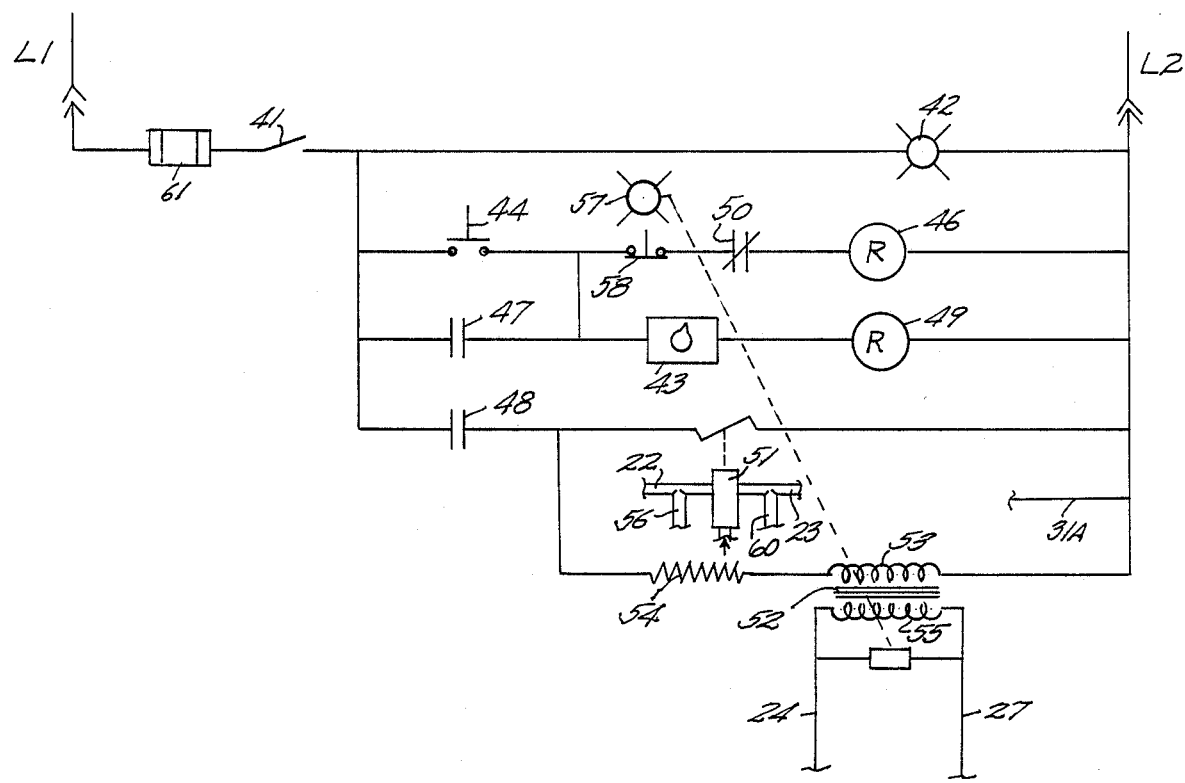
FIG. 4 is an electrical schematic of the present apparatus.

The present apparatus is intended for use in animal processing establishments such as meat packing plants wherein animals are processed in a consecutive and rapid manner.

In the accompanying drawings the reference numeral 1 indicates a killing box which may be any suitable design for the admission and momentary confinement of the animal to be electrocuted such as a steer at 2. An operator 3 of the system is located in a protected and elevated manner preferably near an end of the box 1 and the head of the animal for reasons later elaborated.

The apparatus includes a tool generally at 4, guided manually by the operator into bone penetrating engagement with the animal. Said tool includes an elongate tubular main body 5 of a size and weight conveniently manipulated by the operator. Main body 5 serves to house motor means shown as an air cylinder 6 having a piston 7 and a piston rod 8. Rod 8 at its outer end drives links 10 and 11 pinned at 12 to the rod. The links terminate outwardly in pinned attachment at 13 and 14 to jaws 15 and 16 carried by a pivot pin 17 in place on a collar shaped cylinder extension at 18 carried by the rod end 19 of cylinder 6. Pin 17 extends through bosses as at 20 on the cylinder extension.

The jaws 15 and 16, as viewed in FIG. 3, have interposed flanges 15A–16A apertured to receive pivot pin 17 with spacers at 21. Link pins 13–14 are between pivoted jaw ends 15A–16A and distal jaw ends 15B–16B.

Air lines at 22 and 23 serve respectively the base and rod ends of cylinder 6 and extend rearwardly from the tool terminating in a control box as later described. Air line couplings are not shown. Flexible conduit at 28 houses lines 22–23 and wiring.

Electrical current is imparted to the jaws during an operating cycle of the tool by a lead 24 and terminal post 25 from which current may flow essentially through the cylinder 6 and pivot pin 17 which advantageously avoids wire leads to the jaws.

For completion of a circuit through an animal to ground, the killing box 1 is equipped with a conductive mat or surface 26 with an isolated ground wire at 27. Such a mat may be expanded metal with conductance enhanced by wetting of same.

With attention again to the tool indicated generally at 4, the same may be of synthetic material such as PVC pipe stock having a guard 30 at its jaw equipped end. A flexible cup 29 about the jaws inhibits burning of hide and hair. A conductive band 31 is grounded to interrupt any spurious current flow along main body 5. A handgrip surface area 32 is forwardly defined by an annular barrier 33.

Tether means for tool 4 includes a tether line 34 attached to the rearward end of the main body 5 by a clamp 35 apertured to receive a looped end 34A of the line. The line 34 extends upwardly past the operator's station and over a sheave 37 and to tether tensioning means such as an air cylinder 36. Line 34 may otherwise be tensioned by tether means including a second sheave and a weight arrangement. As later explained, the cylinder 36, when its rod 36A is extended, provides slack in tether 34 and, at the end of a system cycle, automatically retracts the tether to remove the tool from the knocking box.

A control box at 40 is located adjacent the operator's work station and includes a system master switch 41 and a system ready light 42. Momentary closing of switch 44 on tool body 5 starts an electrocution cycle by providing a potential to a relay 46 which closes relay operated switches at 47 and 48. Operation of a timer 43 is accordingly initiated which energizes a second relay at 49 for a timer controlled period. Switch 48 provides a current flow to a solenoid operated air valve 51 and to the primary coil 53 of a transformer 52. A resistor is at 54. A transformer secondary coil at 55 is in circuit with the tool jaws via lead 24 and with the killing box mat 26 via isolated ground lead 27. Solenoid valve 51 directs air via air line 22 to the base of cylinder 6 to extend rod 8 and drive the hide penetrating jaws 15–16 closed. A branched air line at 56 provides air pressure to the retraction means and specifically the base end of double acting air cylinder 36 for rod extension of rod 36A and slacking of tether 34.

A signal light 57 indicates increased voltage from the transformer is being applied to the tool jaws. A system kill switch is at 58.

Upon timing out of timer 43, relay 49 opens a relay operated, time delay opening switch 50 to deenergize relay 46 and open switches 47 and 48 to terminate transformer operation and shift solenoid air valve 51 to pressurize, via air line 23, the rod end of cylinder 6 to retract piston rod 8 and open jaws 15 and 16. Tether line 34 is automatically retracted by the retraction means 36 to remove the present tool from the killing box confines by charging a branched air conduit 60 serving the rod end of the tether cylinder.

The tool 4 need only be guided into contact with the animal, preferably a skeletal portion thereof such as the snout area of the skull, and the switch 44 momentarily actuated to effect jaw penetration into secure engagement with the skeletal portion of the animal.

The electrical system above described operates on 120 V.A.C. 60 HZ., with the transformer having a rating of 120–600 V.A.C. 500 VA. A fuse at 61 is rated at 15 amps.

While tool cylinder 6 is disclosed preferably as being a double acting cylinder, the same may be a single acting, spring return cylinder. As above mentioned, tether cylinder 36 may be dispensed with in a modified retraction means and tether line 34 routed instead over a second sheave and provided with a counterweight for automatic retraction of the tool upon opening of the tool jaws.

Normal operation of the system involves setting of timer 43 for a period of up to approximately 30 seconds with the timer period being somewhat less for animals of lesser size than the steer shown at 2.

While I have shown but a few embodiments of the invention, it will be apparent to those skilled in the art that the invention may be embodied still otherwise without departing from the spirit and scope of the invention.

Having thus described the invention, what is claimed and desired to be secured in a Letters Patent is:

1. A handheld tool for administering electrical current to an animal for electrocution of the animal, said tool comprising in combination, an elongate body adapted for gripping adjacent one end, pivot means carried at the remaining end of said body, conductive jaws having pivoted ends supported by said pivot means carried by said elongate body and distal ends for penetration of the animal hide and into forceful contact with a skeletal portion of the animal, said jaws adapted to receive an electrical charge, a pressure responsive cylinder with a piston rod housed within said elongate body, linkage comprising links coupling said piston rod to said jaws at points intermediate the pivoted and distal ends of each jaw and imparting opening and closing movement to the jaws about said pivot means, and switch means on said elongate body for controlling current flow to said jaws.

2. The tool claimed in claim 1 additionally including tethering means coupled to said one end of the elongate body.

3. The tool claimed in claim 2 wherein said tethering means includes a line, retraction means for varying the effective length of siad line.

4. The tool claimed in claim 1 wherein said pivot means is electrically conductive during tool operation.

5. The tool claimed in claim 1 wherein said cylinder includes an extension projecting from one end of said cylinder, said pivot means carried by extension, said linkage comprising a pair of links coupling said piston rod to said jaws, said jaws receiving a current flow from said pivot means.

6. The tool claimed in claim 1 wherein said linkage serves to provide a current flow to said conductive jaws, said current flow constituting at least a portion of said electrical charge to the conductive jaws.

7. The tool claimed in claim 1 wherein said jaws have flanges disposed in an interposed manner with one another on said pivot means.

8. The tool claimed in claim 1 wherein said elongate body includes a flexible cuff carried by said removing end of the elongate body and engageable with the animal to isolate a portion of the animal's hide from the atmosphere to inhibit burning of the hide.

* * * * *